United States Patent
Imai et al.

(12)

(10) Patent No.: US 6,199,760 B1
(45) Date of Patent: Mar. 13, 2001

(54) MAGNETIC CARD READER AND CARD TAKING-IN METHOD FOR MAGNETIC CARD

(75) Inventors: Eiji Imai; Yukio Kuroiwa, both of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/234,124

(22) Filed: Jan. 19, 1999

(30) Foreign Application Priority Data

Jan. 19, 1998 (JP) .................................................. 10-008049

(51) Int. Cl.$^7$ .................................................. G06K 13/08
(52) U.S. Cl. ........................... 235/480; 235/475; 235/449
(58) Field of Search ..................................... 235/475, 480, 235/449

(56) References Cited

U.S. PATENT DOCUMENTS

| | | | |
|---|---|---|---|
| 4,864,114 | * | 9/1989 | Briane et al. .......................... 235/480 |
| 4,907,257 | * | 3/1990 | Asano et al. ...................... 235/480 X |
| 4,950,877 | * | 8/1990 | Kuhihara et al. ..................... 235/480 |
| 5,362,951 | * | 11/1994 | Kanazawa et al. ................... 235/449 |

* cited by examiner

*Primary Examiner*—Karl D. Frech
(74) *Attorney, Agent, or Firm*—Sughrue, Mion, Zinn, Macpeak & Seas, PLLC

(57) ABSTRACT

When, in the case where card take-in means 3 takes in a magnetic card 10, a magnetic head 4 outputs a predetermined reproducing signal, the magnetic card is taken in; and when the predetermined reproducing signal is not outputted by the magnetic head, the magnetic card take-in operation is stopped. The magnetic head 4 is provided near a card inserting inlet 2, so that, when the card take-in operation is stopped, the rear end 10a of the card 10 is protruded from the card inserting inlet 2.

9 Claims, 2 Drawing Sheets

MAGNETIC CARD READER AND CARD TAKING-IN METHOD FOR MAGNETIC CARD

BACKGROUND OF THE INVENTION

1. Field of the Invention

This invention relates to magnetic card readers, and more particularly to a magnetic card reader which identifies a magnetic card, and insert it into the magnetic card reader.

2. Related Art

FIG. 3 is an explanatory diagram showing the arrangement of a conventional magnetic card reader. In the magnetic card reader, the magnetic card inserted into the reader is conveyed to a predetermined position to perform data recording and reading operations. In this case, in order to avoid the insertion of an incorrect card—different in kind, the magnetism of the card is detected with a prehead 101 provided at the card inserting inlet, and with a shutter operated in association with the prehead 101 the insertion of the incorrect card is prevented.

As for such a card reader, especially as for a small card reader, there is a strong demand for elimination of the prehead 101 to increase the space thereby to decrease the manufacturing cost. In order to meet this requirement, in one example of the magnetic card reader, a magnetic head 103 for magnetic data is also used as the prehead 101.

On the other hand, the magnetic card reader which is so designed that the magnetic head 103 operates also as the prehead 101, suffers from the following problem: For instance in the case where a card different in configuration or having a hole has been inserted in the card reader, the sensor operates erroneously, so that the card may be caught in the reader or cannot be taken out. This problem may be solved if, before the card has been fully inserted in the reader, it is detected whether or not it is a correct one.

SUMMARY OF INVENTION

Accordingly, an object of the invention is to provide a magnetic card reader in which the magnetic has the identifying function of the prehead, and before a card has been fully inserted into the reader, it is determined whether or not the card is a correct one or its kind is detected.

According to an aspect of the present invention, there is provided a magnetic card reader comprising:

card take-in means for taking a magnetic card in a card reader which is inserted in a card inserting inlet;

a magnetic head for reproducing magnetic data which is provided on said magnetic card;

detecting means for detecting the insertion of said magnetic card, said detecting means being nearer to said card inserting inlet than to said magnetic head, wherein when said detecting means detects the insertion of said magnetic card, said card take-in means starts a card take-in operation, when, during said card take-in operation, said magnetic head detects a predetermined signal which has been recorded on said magnetic card in advance, said card take-in operation is continued, and said magnetic head reproduces said magnetic data, and when said predetermined signal is not detected by said magnetic head, said card take-in operation is stopped.

As was described above, in the magnetic card reader of the invention, when, after the card take-in means starts the magnetic card take-in operation, the predetermined signal recorded in the magnetic card in advance is detected by the magnetic head, the magnetic card take-in operation is continued, and the magnetic data is reproduced by the magnetic head; and when the predetermined signal is not detected by the magnetic head, the magnetic card take-in operation is stopped. Therefore, only a correct magnetic card can be taken in the magnetic card reader. Furthermore, in the magnetic card reader of the invention, the distance between the card inserting inlet and the magnetic head is shorter than the length of the magnetic card as viewed in the direction of conveyance. Hence, before the whole magnetic card is taken in the card reader, it can be determined whether the card is correct or not. This feature eliminates the difficulty that the magnetic card is caught in the card reader.

In the magnetic card reader of the invention, the magnetic head detects the presence or absence of the predetermined signal of the magnetic card to determine whether the object inserted is a magnetic card. That is, in this case, the magnetic head has an ordinary function of reproducing or recording data on the magnetic card, and the function of determining whether the object inserted therein is a magnetic card or not. The magnetic card inserted into the magnetic card reader is brought into contact with the magnetic head, and when the predetermined signal is outputted, it is determined that the magnetic card is a correct one. Accordingly, it is unnecessary to use the prehead for identification of a magnetic card which has been used in the conventional art. This feature makes it possible to design the magnetic card read compact, and utilize the space economically.

BRIEF DESCRIPTION OF THE DRAWINGS

FIG. 1 is an explanatory diagram for a description of the relationship between a magnetic card and the magnetic card reader.

DETAILED DESCRIPTION OF PREFERRED EMBODIMENTS

A magnetic card reader, an embodiment of this invention, will be described with reference to the accompanying drawings.

Figure 1:
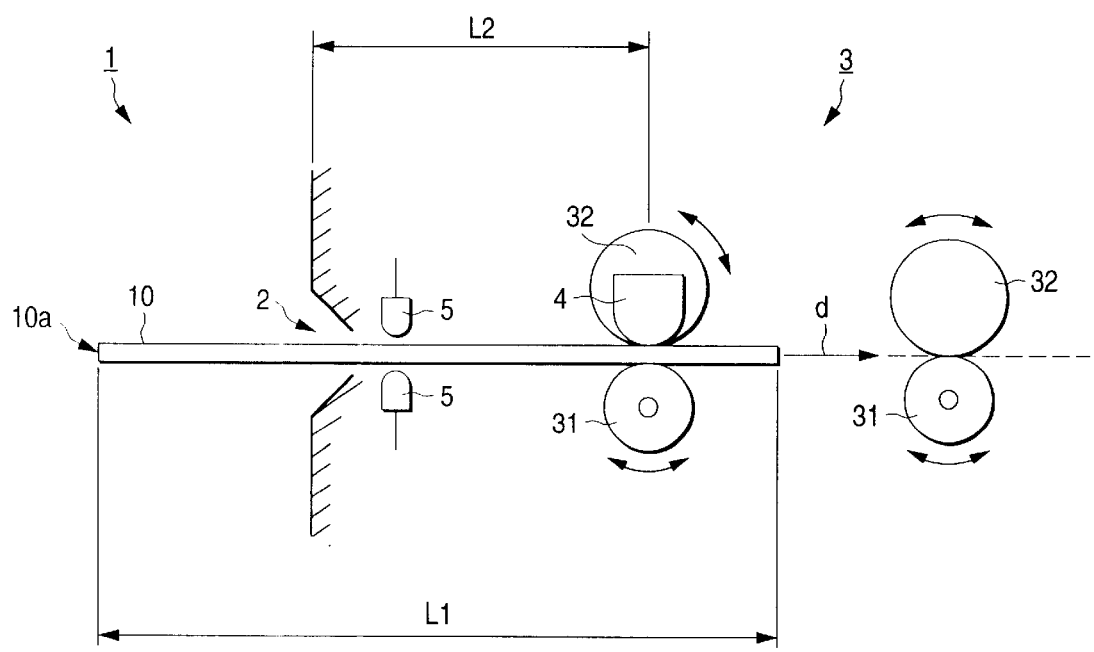
FIG. 1 is a diagram showing an example of a card take-in method in a magnetic card reader of the invention. More specifically.
Figure 2:
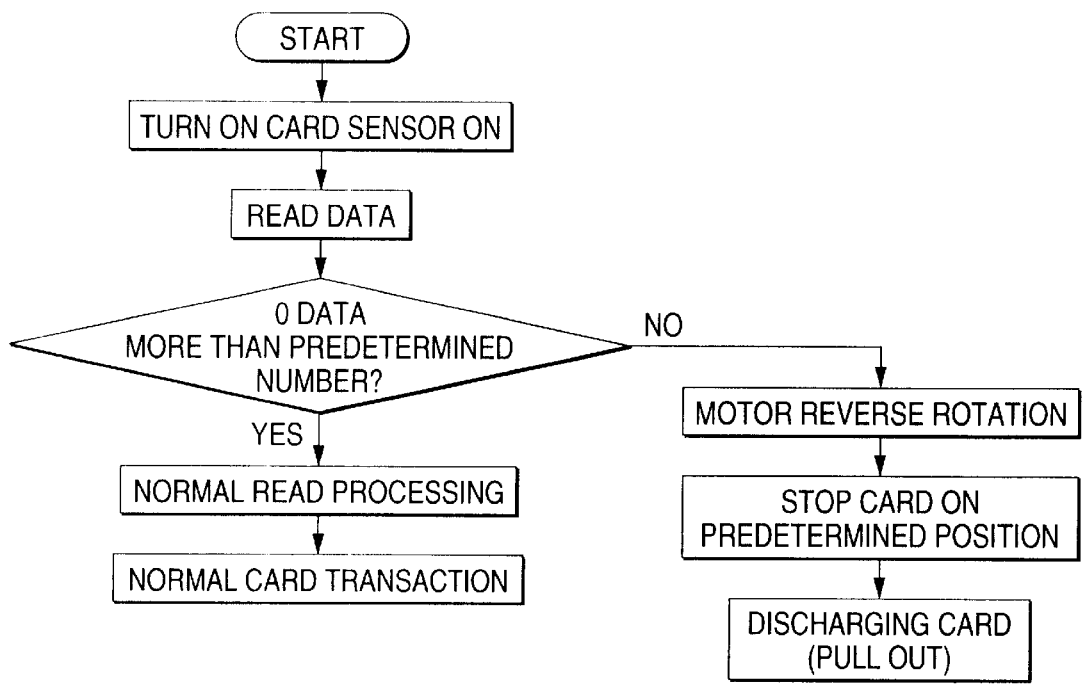
FIG. 2 is a flow chart for a description of a procedure of taking a magnetic card in the magnetic card reader.
Figure 3:
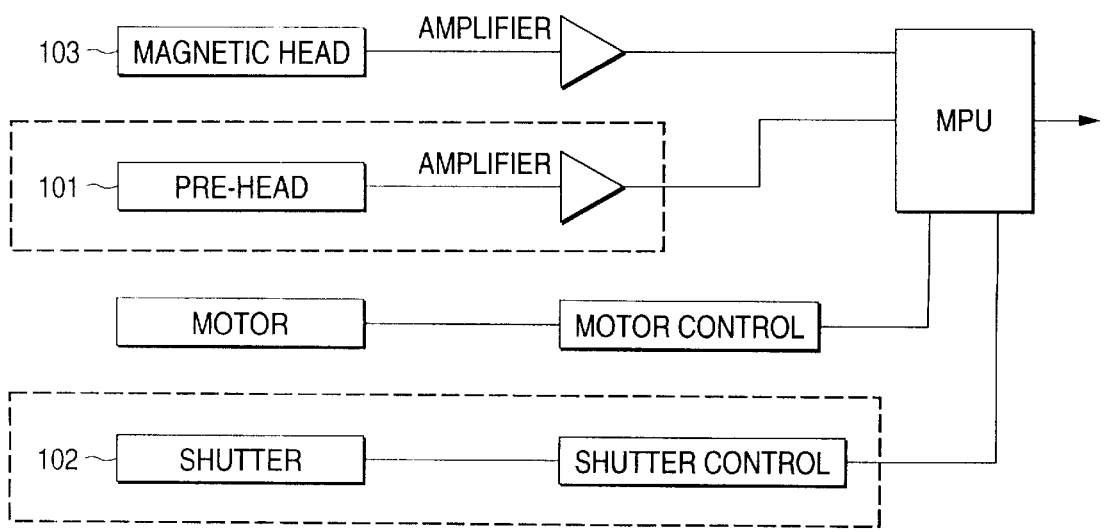
FIG. 3 is a diagram for a description of the arrangement of a conventional magnetic card reader.

The embodiment is as shown in FIGS. 1 and 2. The magnetic card reader comprises card take-in means for taking a magnetic card 10 inside which has been inserted through a card inserting inlet 2, a magnetic head 4 for reproducing magnetic data provided on a magnetic card 10 (hereinafter referred to as "a card 10", when applicable), and detecting means, namely, detecting switches 5 for detecting the insertion of the card 10 through the card inserting inlet 2. The detecting switches 5 are provided at the middle of the distance between the card inserting inlet 2 and the magnetic head 4.

In the embodiment, the data track of the card 10 has card identifying data recorded. The card identifying data can be read with the magnetic head 4, and it is used for identifying or classifying a card 10. In the embodiment, as the above-described identifying data, in the first portion (as viewed in the direction of insertion) of the card 10, data is provided which consists of a predetermined number of 0 (zero) data. The number of 0 data is used to detect whether or not the card is correct. The 0 data region is the first data region of the data tract of the magnetic card 10. That is, the first data region of the magnetic card 10 is the succession of 0 data. The magnetic head reads and reproduces the 0 data, to determine whether or not the card take-in operation is continued. The identifying data recorded on the card 10 is not limited to the 0 data; that is, it goes without saying that any data which can be read by the magnetic head 4 may be recorded on the card 10.

The magnetic head provided near the card inserting inlet 2 is so designed that the card take-in operation is suspended, the rear end 10a of the card is protruded from the card inserting inlet 2. In the case where the card 10 inserted through the card inserting inlet 2 is not a correct one, and the card take-in operation is stopped, at least the rear end of the card 10 is protruded from the card inserting inlet 2. Therefore, the card 10 can be manually pulled out. Accordingly, the distance L2 between the card inserting inlet 2 and the magnetic head 4 is shorter than the length L1 (as viewed in the direction of conveyance) of the card 10. If the magnetic card 10 is caught by the rollers 31 and 32 of the card take-in means 3, then the incorrect cart can be discharged from the magnetic card reader or stopped there.

In the case where the card take-in means 3 takes in a magnetic card 10, and the magnetic head 4 outputs a predetermined reproducing signal; that is, when a correct card is inserted into the card inserting inlet, the magnetic card 10 is taken inside the magnetic card reader. On the other hand, the magnetic head 4 outputs no predetermined reproducing signal, the card take-in operation is stopped. In this case, the card take-in means 3 is the combination of the drive rollers 31 and 31 and the conveyance rollers 32 and 32. By turning the drive rollers 31 and 31, the card 10 is taken inside the card reader while being gripped by the rollers. On the other hand, by turning the drive rollers 31 and 31 in the opposite direction, the card 10 can be conveyed towards the card inserting inlet 2. In the embodiment, the card take-in means 3 has an electric motor (not shown) to drive the card conveying drive means.

By stopping the card take-in means 3, the magnetic card take-in operation is stopped. In this connection, a mode that the stop state is continued (described later) and a mode that the card 10 is discharged. One of the two mode is suitably employed.

In the embodiment, inside the card inserting inlet 2, in which a card 10 is inserted, the detecting switches 5 adapted to detect the insertion of a magnetic card 10. When the insertion of a card 10 is detected by the detecting switches 5, the motor for driving the card take-in means 3 is turned in the card taken-in direction d, while the magnetic head 4 is activated. When the magnetic head 4 outputs the predetermined reproducing signal, the rotation of the motor is continued. When the predetermined reproducing signal is not produced, the motor is stopped or turned in the reverse direction.

FIG. 2 is a flow chart for a description of an example of the card take-in operation of the above-described magnetic card reader. When the detecting means, namely, the detecting switches 5 has detected the insertion of the card 10, the motor is driven to turn the drive rollers 31 and 31 in the take-in direction, while the magnetic head 4 is activated. In the first region of the magnetic card 10, 0 data are arranged. Hence, the identification of the card depends on whether or not the 0 data is detected or not. As a result, in the case where a predetermined number of 0 data are detected, the card reading operation or recording operation is carried out as a part of an ordinary card take in and out operation.

On the other hand, when it is determined that the card is incorrect, it is suspended to take in the card. In one example of this case, the motor is stopped to stop the card 10 at the predetermined position; that is, the card is not taken in over the predetermined position. In this connection, a first mode that the card is maintained stopped, or a second mode that the motor is turned in the reverse direction so that the card 10 is discharged through the card inserting inlet 2, can be freely selected. The first mode and the second mode are different from each other in the amount of protrusion of the rear end 10a of the card 10. In any case, as shown in FIG. 1, a part of the card 10 is protruded from the card inserting inlet, so that the card can be pulled out with the fingers.

In the above-described card take-in method, the magnetic head 4 of the magnetic card reader 1 has the conventional prehead. Hence, it is unnecessary to provide the prehead. Hence, especially in a small magnetic card reader 1, the space can be effectively utilized, and the manufacturing cost can be decreased. Furthermore, in the invention, before the card 10 is fully taken in the magnetic card reader 1, it is determined whether or not the card is correct or the kind of the card is detected. Hence, even if the card is abnormal in configuration or has a hole, the difficulty is eliminated that the sensor operates erroneously and the card is caught in the reader.

In the magnetic card read of the invention, the magnetic head reproduces the first part of data recorded in the data track of the magnetic card, so that it is determined whether or not the card take-in operation is continued. Hence, only the card whose data part has correct data are taken in the magnetic card reader. Accordingly, with the magnetic head, the identifying operation, and the recording or reproducing operation of the magnetic card can be carried out.

While there has been described in connection with the preferred embodiment of the invention, the invention is not limited thereto or thereby, and it will be obvious to those skilled in the art that various changes and modifications may be made therein without departing from the invention. For instance, in the embodiment, the magnetic head 4 detects the presence or absence of the predetermined reproducing signal of the magnetic card 10 to identify the card; however, the identifying signal is not limited to the reproducing signal. That is, it may be any signal which can identify a correct magnetic card.

As was described above, in the magnetic card reader of the invention, when, after the card take-in means starts the magnetic card take-in operation, the predetermined signal recorded in the magnetic card in advance is detected by the magnetic head, the magnetic card take-in operation is continued, and the magnetic data is reproduced by the magnetic head; and when the predetermined signal is not detected by the magnetic head, the magnetic card take-in operation is stopped. Therefore, only a correct magnetic card can be taken in the magnetic card reader. Furthermore, in the magnetic card reader of the invention, the distance between the card inserting inlet and the magnetic head is shorter than the length of the magnetic card as viewed in the direction of conveyance. Hence, before the whole magnetic card is taken in the card reader, it can be determined whether the card is correct or not. This feature eliminates the difficulty that the magnetic card is caught in the card reader.

In the magnetic card reader of the invention, the magnetic head detects the presence or absence of the predetermined signal of the magnetic card to determine whether the object inserted is a magnetic card. That is, in this case, the magnetic head has an ordinary function of reproducing or recording data on the magnetic card, and the function of determining whether the object inserted therein is a magnetic card or not. The magnetic card inserted into the magnetic card reader is brought into contact with the magnetic head, and when the predetermined signal is outputted, it is determined that the magnetic card is a correct one. Accordingly, it is unnecessary to use the prehead for identification of a magnetic card which has been used in the conventional art. This feature makes it possible to design the magnetic card read compact, and utilize the space economically.

What is claimed is:

1. A magnetic card reader comprising:

card take-in means for taking a magnetic card in said magnetic card reader which is inserted in a card inserting inlet;

a magnetic head for reproducing magnetic data which is provided on said magnetic card;

detecting means for detecting the insertion of said magnetic card, said detecting means being nearer to said card inserting inlet than to said magnetic head, wherein when said detecting means detects the insertion of said magnetic card, said card take-in means starts a card take-in operation, when, during said card take-in operation, said magnetic head detects a predetermined signal which has been recorded on said magnetic card in advance, said card take-in operation is continued, and said magnetic head reproduces said magnetic data, and when said predetermined signal is not detected by said magnetic head, said card take-in operation is stopped.

2. A magnetic card reader as claimed in claim 1, in which said magnetic head reproduces the first data part which has been recorded on the data track of said magnetic card, and reproduces magnetic data following said first data part.

3. A magnetic card reader as claimed in claim 1, in which the distance between said card inserting inlet and said magnetic head is shorter than the length of said magnetic card in the direction of conveyance so that when said card take-in operation is suspended, said magnetic card is positioned where said magnetic card can be taken out through said card inserting inlet.

4. A magnetic card reader as claimed in claim 1, in which, when said card take-in operation is stopped, said magnetic card is maintained to stop said magnetic card.

5. A magnetic card reader as claimed in claim 1, in which said card take-in means includes:

drive means for conveying said magnetic card, and an electric motor for driving said drive means, wherein when said detecting switch detects the insertion of said magnetic card, said motor is turned in the card take-in direction, and when said magnetic head detects said predetermined signal, the rotation of said motor is continued, and when said predetermined signal is not detected, said motor is turned in the reverse direction to discharge said magnetic card.

6. A magnetic card reader as claimed in claim 1, in which said magnetic head is provided near said card inserting inlet so that, when said card take-in operation is stopped, the rear end of said magnetic card is protruded from said card inserting inlet.

7. A magnetic card reader as claimed in claim 1, in which said predetermined signal of said magnetic card is recorded in the first data part of said magnetic card as viewed in the direction of insertion in advance.

8. A magnetic card reader as claimed in claim 1, in which, when said card take-in operation is stopped, said magnetic card is discharged in the reverse direction.

9. A card taking-in method for a magnetic card reader which comprises card take-in means for taking a magnetic card in said magnetic card reader through a card inserting inlet, a magnetic head for reproducing magnetic data which is provided on said magnetic card, and detecting means for detecting the insertion of said magnetic card, said detecting means being nearer to said card inserting inlet than to said magnetic head, said method comprising the steps of:

starting a card take-in operation by said card take-in means when said detecting means detects the insertion of said magnetic card;

continuing said card take-in operation and reproducing said magnetic data by said magnetic head when said magnetic head detects a predetermined signal which has been recorded on said magnetic card in advance; and stopping said card take-in operation when said predetermined signal is undetected by said magnetic head.

* * * * *